(12) United States Patent
Webber

(10) Patent No.: US 6,857,659 B2
(45) Date of Patent: Feb. 22, 2005

(54) AIR BAG MODULE INCLUDING RESTRAINED INFLATABLE CUSHION

(75) Inventor: James Lloyd Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 56 days.

(21) Appl. No.: 10/324,831

(22) Filed: Dec. 20, 2002

(65) Prior Publication Data

US 2004/0119271 A1 Jun. 24, 2004

(51) Int. Cl.$^7$ ............................................... B60R 21/16
(52) U.S. Cl. ............................................... 280/743.2
(58) Field of Search ..................... 280/743.2, 743.1, 280/731, 728.1

(56) References Cited

U.S. PATENT DOCUMENTS

| | | | |
|---|---|---|---|
| 5,125,682 A | 6/1992 | Hensler et al. | 280/730 |
| 5,253,892 A | 10/1993 | Satoh | 280/731 |
| 5,308,113 A | 5/1994 | Moriset | 280/743 |
| 5,489,119 A | 2/1996 | Prescaro et al. | 280/743.2 |
| 5,762,367 A | 6/1998 | Wolanin | 280/736 |
| 5,806,883 A | 9/1998 | Cuevas | 280/731 |
| 5,826,901 A | 10/1998 | Adomeit | 280/728.2 |
| 5,887,892 A | 3/1999 | Burdack et al. | 280/731 |
| 6,076,854 A | 6/2000 | Schenck et al. | 280/743.2 |
| 6,120,057 A | 9/2000 | Adomeit et al. | 280/731 |
| 6,161,866 A | 12/2000 | Ryan et al. | |
| 6,168,187 B1 | 1/2001 | Yamada et al. | 280/728.3 |
| 6,170,871 B1 * | 1/2001 | Goestenkors et al. | 280/743.1 |
| 6,180,207 B1 | 1/2001 | Preisler et al. | 428/139 |
| 6,203,061 B1 | 3/2001 | Niederman et al. | |
| 6,213,502 B1 | 4/2001 | Ryan et al. | |
| 6,247,724 B1 | 6/2001 | Jambor et al. | 280/731 |
| 6,247,726 B1 | 6/2001 | Ryan | |
| 6,254,121 B1 | 7/2001 | Fowler et al. | 280/729 |
| 6,334,627 B1 | 1/2002 | Heym et al. | 280/743.2 |
| 6,371,517 B1 | 4/2002 | Webber et al. | |
| 6,390,501 B1 | 5/2002 | Greib et al. | 280/743.2 |
| 6,422,597 B1 | 7/2002 | Pinsenschaum et al. | 280/735 |
| 6,431,596 B1 | 8/2002 | Ryan et al. | |
| 6,439,603 B2 | 8/2002 | Damman et al. | |
| 6,454,300 B1 * | 9/2002 | Dunkle et al. | 280/742 |
| 6,499,765 B2 | 12/2002 | Hawthorn et al. | |
| 6,561,545 B2 | 5/2003 | Greib et al. | |
| 6,592,146 B2 | 7/2003 | Pinsenschaum et al. | |

FOREIGN PATENT DOCUMENTS

DE  197 49 914 A1  5/1999

* cited by examiner

*Primary Examiner*—Faye M. Fleming
(74) *Attorney, Agent, or Firm*—Scott A. McBain

(57) ABSTRACT

A tethering restraint system is provided which restrains an inflatable air bag cushion during an extended period of inflation rather than limiting such restraint to the final stages of inflation. Maintaining tethering restraint during the inflation cycle increases the time over which energy is transferred between the air bag cushion and an occupant to be protected thereby reducing the instantaneous force transferred between the occupant and the air bag cushion as contact takes place.

17 Claims, 6 Drawing Sheets

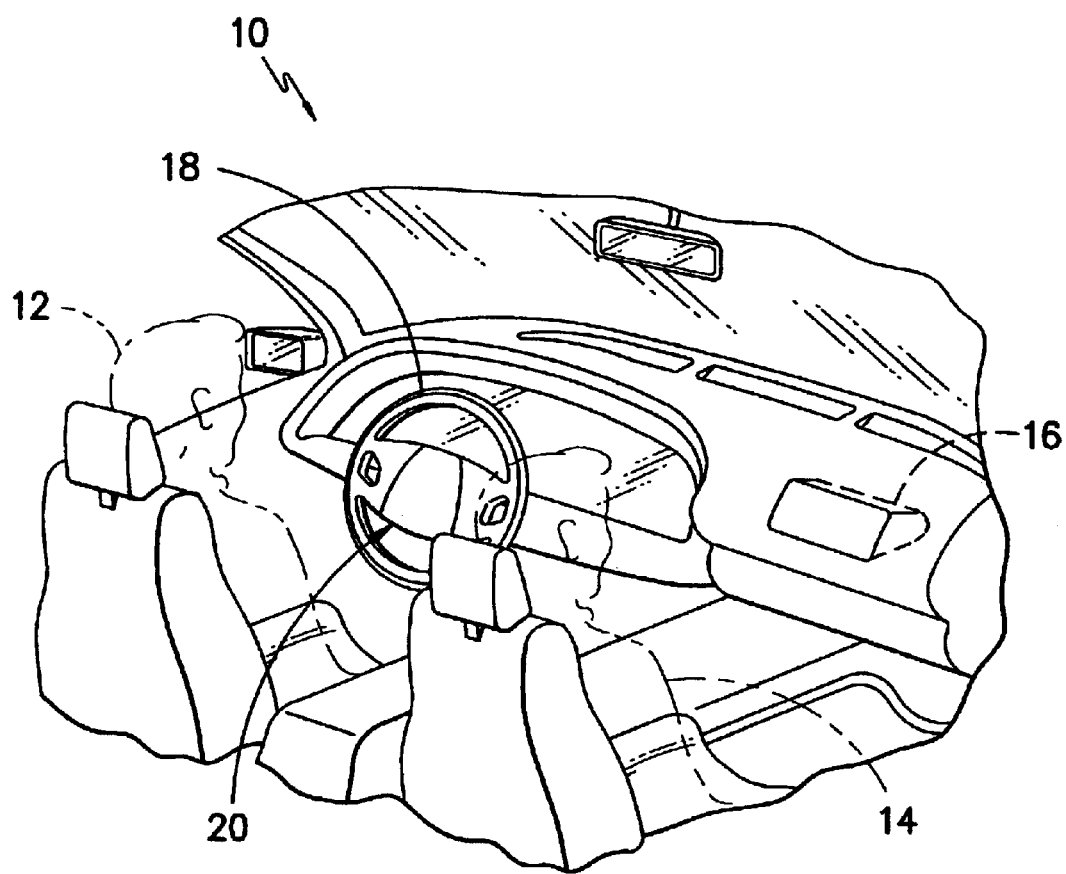
FIG. −1−

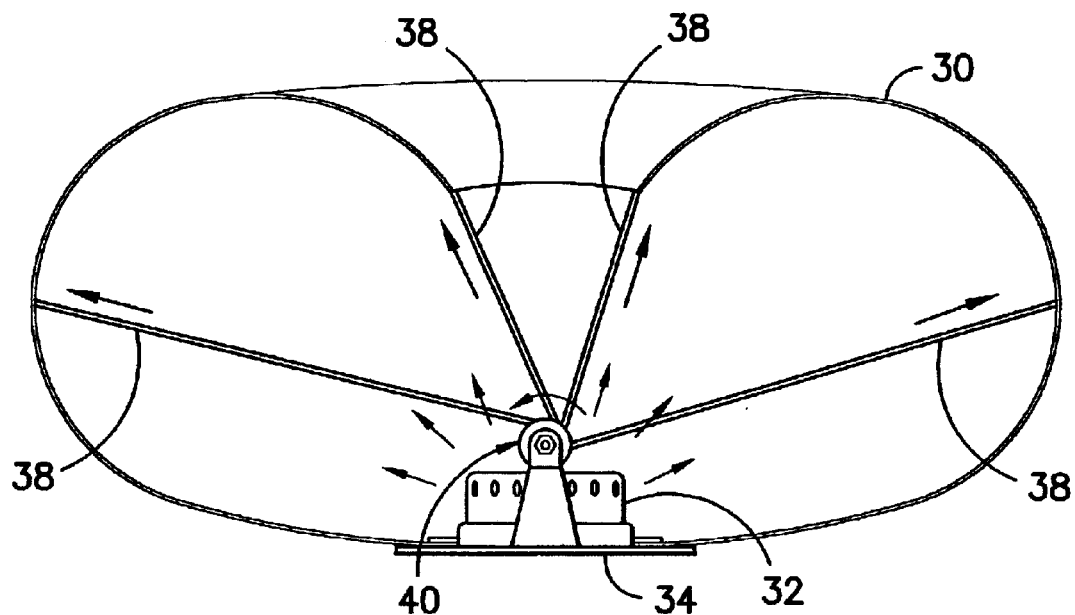
FIG. -2-
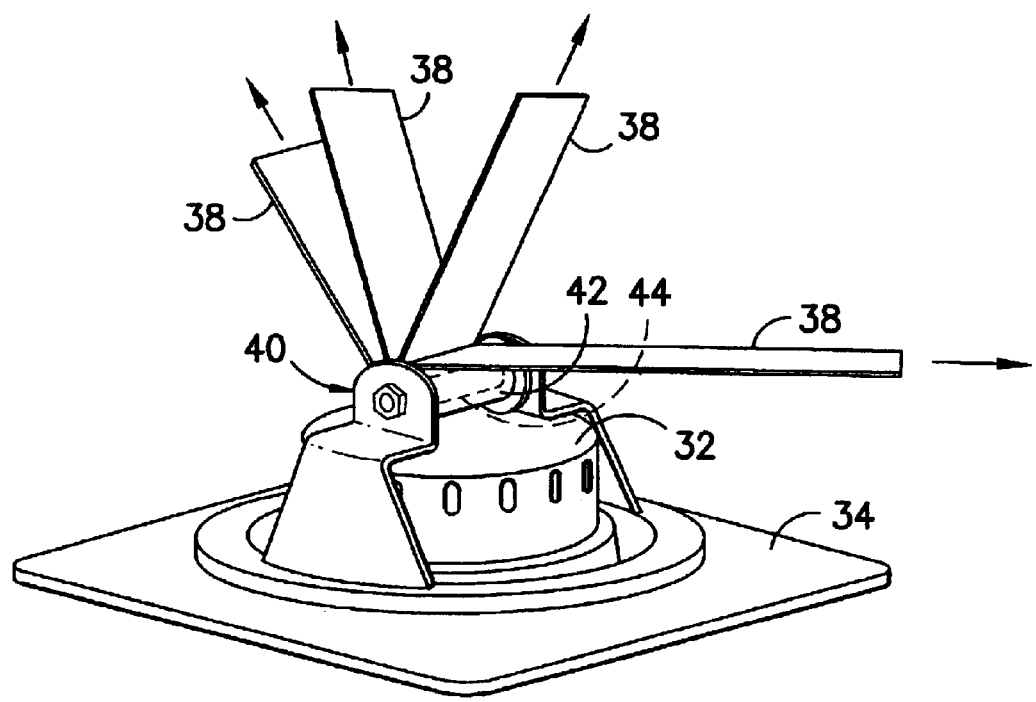
FIG. -3-

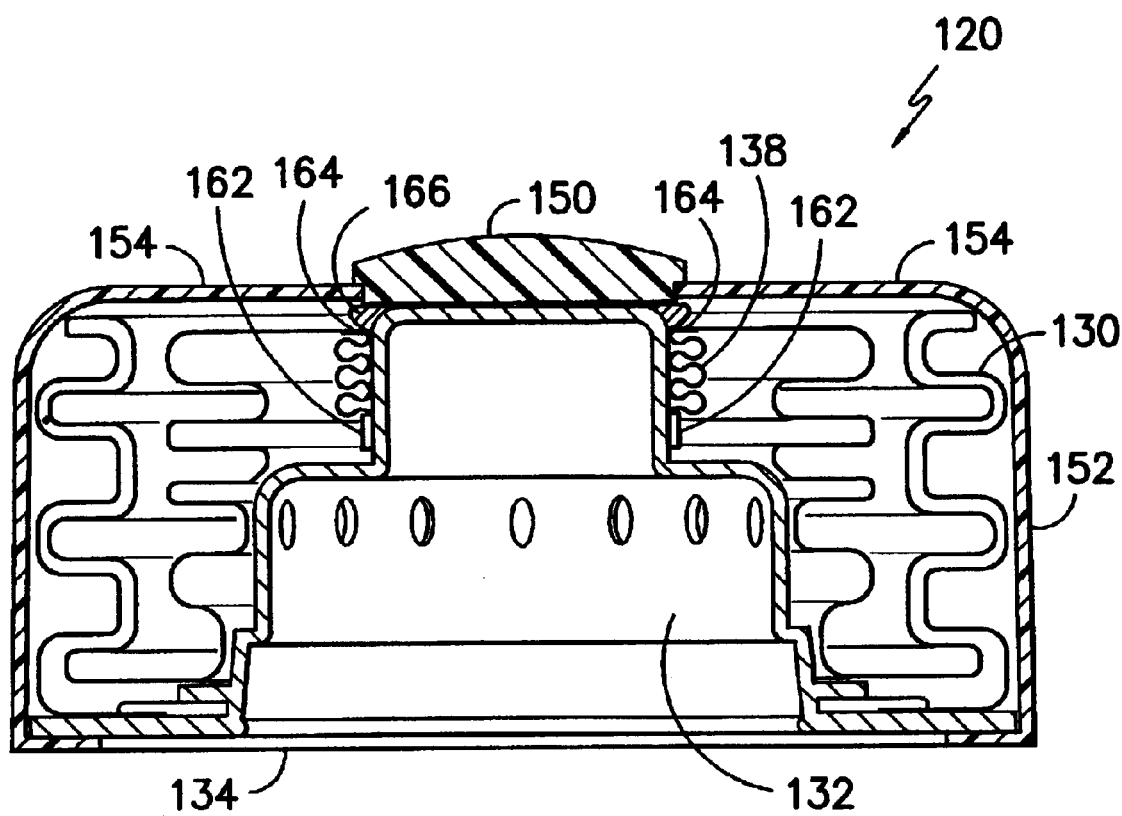
FIG. -4-

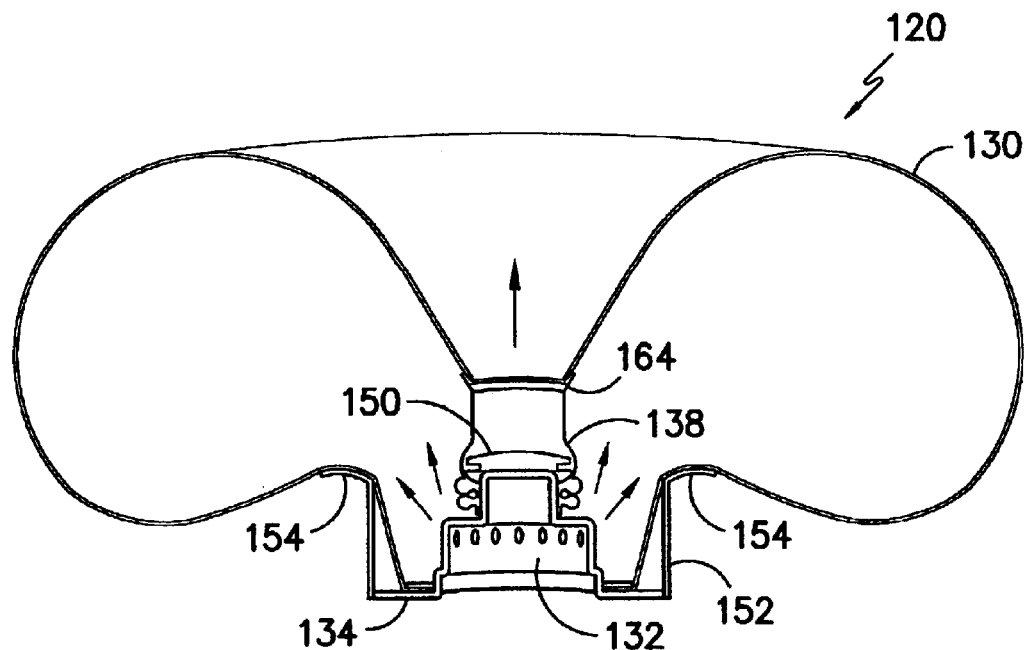
FIG. -5-
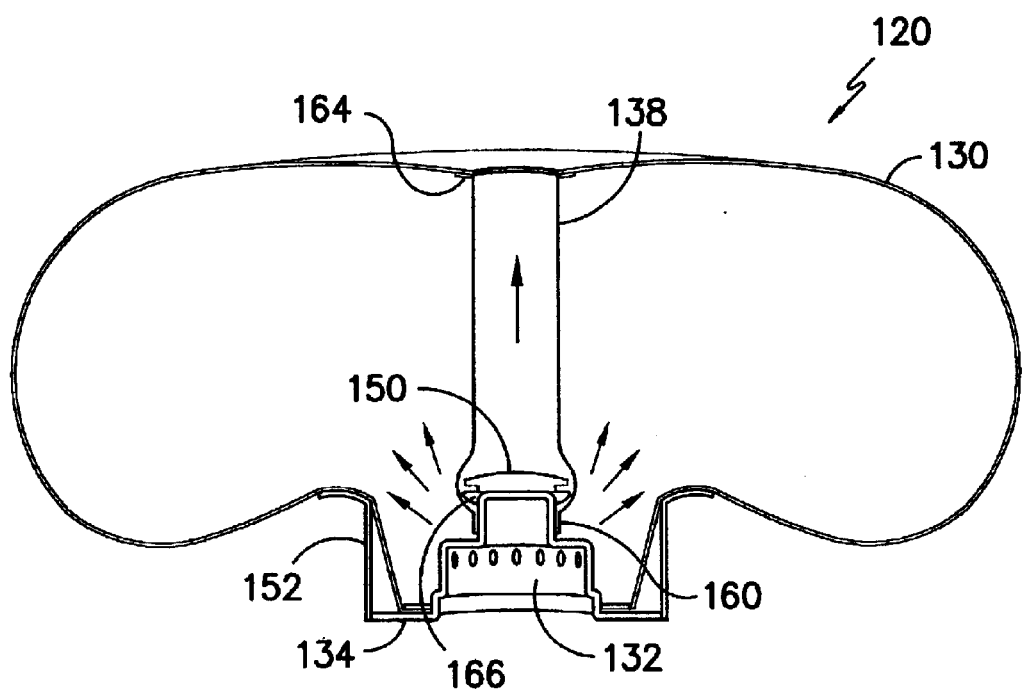
FIG. -6-

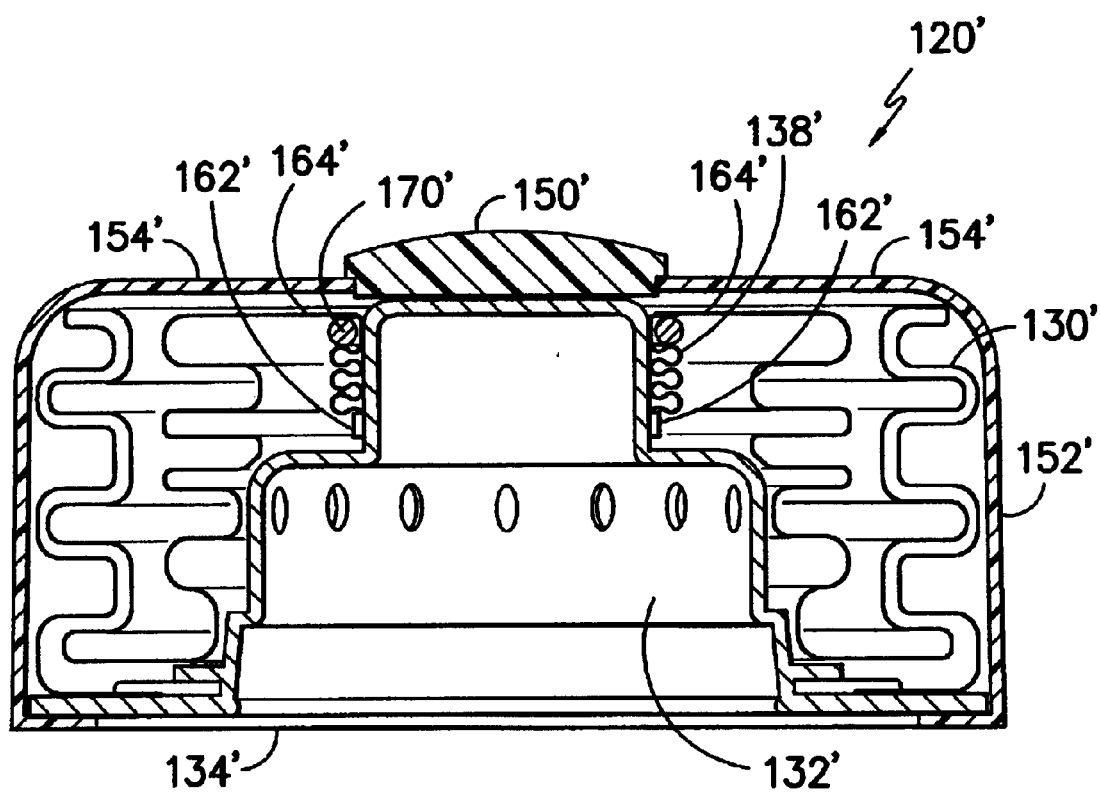
FIG. -7-

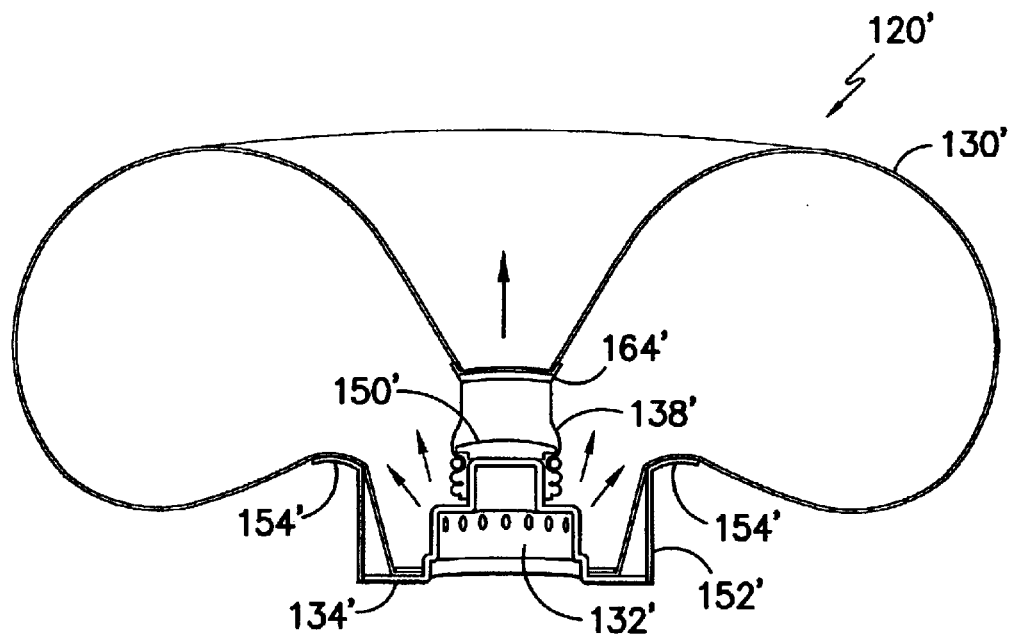
FIG. -8-
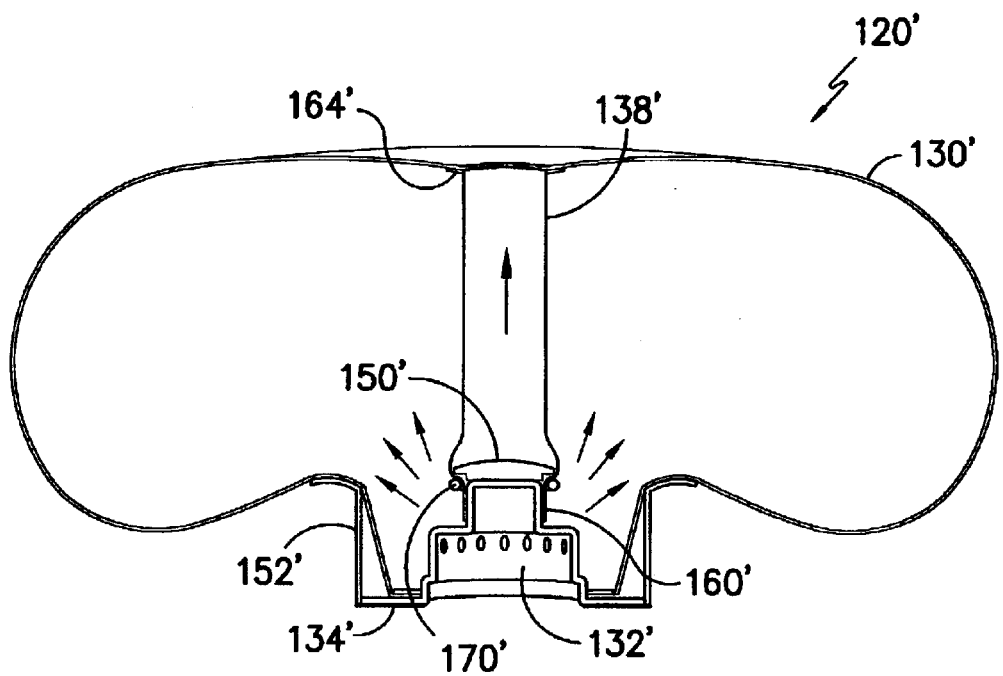
FIG. -9-

AIR BAG MODULE INCLUDING RESTRAINED INFLATABLE CUSHION

TECHNICAL FIELD

This invention relates to an air bag module assembly, and more particularly to an air bag module including an inflatable air bag cushion deployable to an inflatable condition while being maintained under contouring restrained conditions during inflation. The restraint of the air bag cushion during deployment prolongs the period of energy transfer between the air bag cushion and an occupant to be protected thereby reducing the severity of the energy transfer.

BACKGROUND OF THE INVENTION

It is well known to provide an air bag assembly including an inflatable air bag cushion for protecting the occupant of a transportation vehicle. In an automotive vehicle such air bag assemblies are typically located within the hub of the steering wheel and in a recess in the vehicle instrument panel for protection of the vehicle occupants seated in an opposing relation to such assemblies. Additional air bag assemblies may be located within the seats and/or door panels for protection of the occupants during a side impact event. Air bag assemblies typically include an inflatable cushion and a gas emitting inflator mounted in fluid communication with the inflatable cushion. In a driver side air bag module the air bag cushion typically includes a mouth disposed in substantially surrounding relation to the inflator with a perimeter portion of the mouth being held at a fixed position relative to the inflator. In a passenger side assembly the inflator is typically held within a trough-like housing with the air bag cushion being held within the housing such that inflation gas passes from the inflator into the cushion upon activation of the inflator.

In the past, it has been advocated to adjust the inflated profile of air bag cushions by the use of tethering elements which are set to effective operative lengths so as to contour the profile of the air bag cushion at full expansion. The tethering elements may be of either a fixed length in operative relation to the air bag cushion or may be adjustable so as to accommodate persons of different sizes and/or collision events of different severity levels. By way of example only, representative systems for use in effecting a controlled deployment depth of an air bag cushion by the selective adjustment of tethering elements are disclosed in U.S. Pat. No. 6,422,597 to Pinsenschaum et al. and United States Patent Application No. 2002/0036400 A1 in the name of Winters et al. which are both incorporated by reference as if fully set forth herein. While such systems are believed to be useful in providing air bag cushions with discrete contoured profiles, such systems provide for controlled cushion restriction substantially only upon full extension of the tethering elements. That is, the tethering elements are extended to their full operative length before exerting a substantial restraining influence on the air bag cushion.

SUMMARY OF THE INVENTION

The present invention provides advantages and alternatives over the prior art by providing tethering restraint systems which restrain the air bag cushion during an extended period of inflation rather than limiting such restraint to the final stages of inflation. Such arrangements are believed to increase the period of time over which energy is transferred between the air bag cushion and an occupant to be protected thereby reducing the instantaneous force transferred between the occupant and the air bag cushion when contact does take place. Moreover, due to the fact that the air bag cushion is controllably restrained during the filling cycle, the cushion may be targeted more directly to a desired location such as towards the chest of an occupant during the initial stages of impact. Such initial contact at the chest area may be beneficial in some instances.

According to one aspect of the invention it is contemplated that elongate tethering elements may be fed away from a spool or other payout devices which apply a drag force to the tethering elements such that the operative length of the tethering elements is increased only upon the application of a sufficient pulling force by the inflating air bag cushion to overcome the applied drag force on the tethering elements. Thus, as the air bag cushion applies the required pulling force, a tensioning restraint is established along the tethers throughout the expansion cycle.

According to another aspect of the invention an air bag module assembly is provided for use at the interior of a steering wheel assembly incorporating a fixed emblem substantially at the center of the steering wheel. Upon inflation, the air bag cushion emerges in a substantially toroidal configuration around the emblem. A tubular tether member is operatively connected to surface of the air bag cushion and is adapted to pass around the emblem as the cushion inflates. In an unstretched configuration the inner diameter of the tubular tether is slightly less than the outer diameter of the emblem such that a frictional restraining force is applied to the tubular tether as it is carried in stretched relation over the emblem thereby providing a restraining force substantially during the full inflation cycle of the air bag cushion. If desired, a hoop element may be disposed in at least partial surrounding radial relation to the tubular tether at a position below the emblem.

Other aspects of the invention will be apparent through a reading of the following description and/or through practice of the present invention. Accordingly, while the invention will hereinafter be described in connection with certain exemplary illustrated embodiments, constructions and procedures, it is to be understood that in no event is the invention to be limited to such illustrated and described embodiments, constructions and procedures. On the contrary, it is intended that the present invention shall extend to all alternatives and modifications as may embrace the broad principles of this invention within the true spirit and scope thereof.

BRIEF DESCRIPTION OF THE DRAWINGS

The present invention will now be described by a way of example only, with reference to the accompanying drawings which constitutes a part of the specification herein and in which:

FIG. 1 is a view of the interior of an automotive vehicle incorporating driver side and passenger side air bag modules;

FIG. 2 is a cut-away view of an air bag module assembly incorporating an arrangement of extendible tethers extending between an inflatable cushion and a rotatable spool incorporating a torsion bar assembly;

FIG. 3 is a perspective view of an exemplary tether arrangement extending away from a rotatable spool in mounted relation over an inflator;

FIG. 4 is a cut-away side view of an air bag module for use at a steering wheel incorporating a fixed decorative emblem;

FIG. 5 is a view illustrating the module of FIG. 4 with the air bag cushion in a partially inflated state;

FIG. 6 is a view similar to FIG. 5 in which the air bag cushion is fully inflated;

FIG. 7 is a cut-away side view of an air bag module for use at a steering wheel incorporating a fixed decorative emblem and an extendible tubular tether disposed at the interior of a radial hoop element;

FIG. 8 is a view illustrating the module of FIG. 7 with the air bag cushion in a partially inflated state; and FIG. 9 is a view similar to FIG. 7 in which the air bag cushion is fully inflated;

DESCRIPTION OF THE PREFERRED EMBODIMENT

Reference will now be made to the drawings wherein to the extent possible like reference numerals are utilized to designate like components throughout the various views. In FIG. 1 there is illustrated the interior of a vehicle 10 for transporting an operator 12 and a passenger 14. As illustrated, the vehicle 10 may include a passenger side air bag module assembly 16 mounted within the dash panel in substantially opposing relation to the vehicle passenger 14. The vehicle 10 will also preferably include a driver side air bag module assembly 20 mounted within the steering wheel 18 for protection of the vehicle operator 12. Activation of the air bag assemblies 16, 20 typically takes place upon the occurrence and measurement of predetermined vehicle conditions such as deceleration at a rate exceeding a predetermined value.

Referring to FIGS. 2 and 3, an exemplary construction of an air bag module assembly for use in either a driver side or passenger side orientation is illustrated. As shown, the air bag module assembly in FIG. 2 includes an inflatable air bag cushion 30 held in fluid communication with a gas emitting inflator 32 supported at a base structure 34. While the exemplary cushion 30 illustrated in FIG. 2 is of a construction as is normally used in a driver side application, it is to be understood that the actual geometry of the cushion itself is in no way critical to the present invention. Accordingly, it is to be understood that the invention will have equal applicability in a passenger side module assembly as well as in driver side modules incorporating cushions of other configurations.

As illustrated, an arrangement of elongate tethering elements 38 extend in operative connective relation between a surface of the air bag cushion 30 and a payout device 40 which releases the tethering elements 38 from a first operative length to a second increased operative length upon the introduction of an adequate pulling force applied to the tethering elements 38. In practice, this pulling force is introduced by the expansion of the air bag cushion 30 which causes the operatively connected tethering elements 28 to be placed into tension so as to be pulled away from the payout device 40.

According to the illustrated embodiment, the payout device 40 may be in the form of a rotating spool 42 around which the tethering elements 38 are wound. As will be appreciated, while a number of tethering elements 38 are illustrated in wound relation to the spool 42, the device may likewise be operative with either a greater or lesser number of tethering elements 28 as may be desired. In the exemplary device illustrated, the spool 42 is preferably rotatable only upon the introduction of a tensioning force exceeding a predetermined value and will operate in a manner so as to maintain tension within the tethering elements 38 as the air bag cushion 30 is inflated. That is, the payout device 40 applies a drag force opposing tether extension such that during extension tension is maintained within the tether.

By way of example only, and not limitation, the payout device 40 may be in the form of a web retraction unit including a torsion bar 44 such as is used in a seat belt retractor or the like disposed at the interior of the spool 42. One such assembly is illustrated and described in U.S. Pat. No. 6,237,869 to Ahn the contents of which are incorporated herein by reference in their entirety. In operation, as the spool 42 is rotated the torsion bar 44 twists thereby imparting a retracting tension force to the tethering elements 38. Thus, tension may be maintained along the tethering elements 38 substantially over the full inflation cycle of the air bag cushion 30.

It is to be understood that the tension inducing payout device 40 may be of any suitable construction which applies a drag force opposing tether extension. By way of example only, and not limitation, it is contemplated that the torsion bar 44 may be replaced by a torsion spring or an arrangement of deformable elements if desired. It is also contemplated that the tension within the tethering elements may be maintained by introducing a friction element such as a spring loaded slot opening or the like along the length of the tethering elements 38 which requires a predetermined pulling force to permit sliding passage of the tethering elements 38. Of course, any of these elements may be used either alone or in combination with one another as may be desired to provide the desired level of opposing force.

As will be appreciated, the actual arrangement of the tethering elements 38 may be selected so as to define a desired depth profile in the air bag cushion 30. In particular, it is believed that the restrained elongation of the operative length of the tethering elements 38 may be used to promote the early radial expansion of the air bag cushion 30 with substantial depth being developed only at the latter stages of deployment. Such a deployment pattern may be beneficial in some instances.

It is contemplated that the present invention may be susceptible to a wide array of variations and alternative designs. By way of example only, and not limitation, one alternative embodiment is illustrated in FIGS. 4–6 wherein elements corresponding to those previously described are designated by like reference numerals increased by 100. In FIG. 4 a cut-away view of a driver side air bag assembly 120 is shown with a centrally disposed fixed emblem 150 disposed in overlying relation thereto. As shown, in this arrangement the air bag cushion 130 is packed within a housing 152 in surrounding relation to the inflator 132. Upon the expulsion of inflation gas by the inflator 132 the air bag cushion 130 is caused to break out of the housing 152 causing upper portions 154 of the housing 152 to fold back away from the emblem 150. The air bag cushion 130 thereafter expands substantially in the form of a torus or doughnut shape around the emblem 150 which remains at a fixed position. Due to the toroidal shape of the inflated air bag cushion, the emblem 150 can be substantially covered against impact by an imposing occupant.

According to the illustrated embodiment, the air bag assembly 120 includes a tubular tether element 138 having a proximal end 160 (FIG. 6) secured at a first position 162 below the emblem 150. The tubular tethering element 138 further includes a distal end 164 operatively connected around its perimeter to a surface of the air bag cushion 30 such that the tethering clement 138 defines a tube adapted to slide over the emblem 150 as the air bag cushion 130 expands towards the occupant to be protected.

As best illustrated through simultaneous reference to FIGS. 5 and 6, the normal internal diameter of the tubular tethering element 138 is preferably slightly smaller than the outer diameter of the emblem 150. In such an arrangement the tubular tethering element 138 is forced to undergo localized stretching as it passes around the emblem 150. The need to engage in such localized stretching imparts a restraining force to the outward projection of the air bag cushion 130 due to the friction between the tubular tethering element and the emblem 150. As will be appreciated, this restraining force may be adjusted by the selection of the materials forming the tubular tethering element 138 as well as by controlling the internal diameter of the tubular tethering element 138 relative to the emblem 150. That is, if a high degree of restraint is desired the tubular tethering element 138 may be formed of a material having low elasticity and with an internal diameter substantially less than that of the emblem 150. Conversely, if little restraint is desired the tubular tethering element 138 may be formed of a highly elastic material and/or may have an internal diameter which is only slightly less than the outer diameter of the emblem 150.

By way of example only, and not limitation, it is contemplated that the tethering element 138 may be formed from a textile material of relatively limited stretching character and with air permeability characteristics substantially matching those of the air bag cushion. Such materials may include woven Nylon and polyester. In the event that additional stretch is desired, it is contemplated that a knit construction and/or fibers of elastic character may be incorporated within the tethering element 138.

As illustrated, it is contemplated that a bridging surface element 166 of construction such as a half toroid or the like may be disposed at a position immediately below the emblem 150. The bridging surface element 166 preferably has a relatively smooth rounded profile of gradually increasing diameter so as to provide a relatively uniform transition surface to effect the stretched passage of the tethering element around the bridging surface element 166 and thereafter over the emblem in a substantially uniform manner. Such a bridging surface may aid in the substantially uniform progressive passage of the tethering element 138 around the emblem 150.

In operation, the air bag cushion 130 will normally tend to expand preferentially in a radial dimension until forces are built up which are sufficient to carry the tubular tethering element 138 around the bridging surface element 166 and the fixed emblem 150. Thus, a relatively broad inflation profile is developed at an early stage of deployment which may be beneficial in some instances.

Another exemplary embodiment is illustrated in FIGS. 7–9 wherein elements corresponding to those previously described in relation to FIGS. 4–6 are designated by like reference numerals with a prime. In FIG. 7 a cut-away view of a driver side air bag assembly 120' is shown with a centrally disposed fixed emblem 150' disposed in overlying relation thereto. As shown, in this arrangement the air bag cushion 130' is packed within a housing 152' in surrounding relation to the inflator 132'. Upon the expulsion of inflation gas by the inflator 132' the air bag cushion 130' is caused to break out of the housing 152' causing upper portions 154' of the housing 152' to fold back away from the emblem 150'. The air bag cushion 130' thereafter expands substantially in the form of a torus or doughnut shape around the emblem 150' which remains at a fixed position. Due to the toroidal shape of the inflated air bag cushion, the emblem 150' can be substantially covered against impact by an imposing occupant.

According to the illustrated embodiment, the air bag assembly 120' includes a tubular tether element 138' having a proximal end 160' (FIG. 9) secured at a first position 162' below the emblem 150'. The tubular tethering element 138' further includes a distal end 164' operatively connected around its perimeter to a surface of the air bag cushion 130' such that the tethering element 138' defines a tube adapted to slide over the emblem 150' as the air bag cushion 130' expands towards the occupant to be protected. The tethering element 138' may be at least partially surrounded by a hoop element 170' such as a ring, flexible cord or the like which provides constraining radial containment to the tethering element in the vicinity of the transition zone between the tethering element 138' and the emblem 150'. Such constraining radial containment at this position may aid in the uniform progressive passage of the tethering element over the emblem 150'.

As best illustrated through simultaneous reference to FIGS. 8 and 9, during extension the tethering element 138' passes through the interior of the hoop element 170 and thereafter passes around the overlying emblem 150'. It is believed that the presence of the hoop element may aid in stabilizing the tethering element during extension thereby providing a more uniform extension characteristics. As with the previously described embodiments, the normal internal diameter of the tubular tethering element 138' is preferably slightly smaller than the outer diameter of the emblem 150'. In such an arrangement the tubular tethering element 138' is forced to undergo localized stretching as it passes around the emblem 150'. The need to engage in such localized stretching imparts a restraining force to the outward projection of the air bag cushion 130' due to the friction between the tubular tethering element and the emblem 150'. Of course, as with the previously described embodiments, this restraining force may be adjusted by the selection of the materials forming the tubular tethering element 138' as well as by controlling the internal diameter of the tubular tethering element 138 relative to the emblem 150.

It is to be appreciated that while the present invention has been illustrated and described in relation to various exemplary embodiments, constructions and practices, that such embodiments, constructions and practices are intended to be illustrative only in that the present invention is in no event to be limited thereto. Accordingly, it is contemplated and intended that the present invention shall extend to all such modifications and variations as may be incorporated within the broad principles of the invention within the full spirit and scope thereof.

What is claimed is:

1. An air bag assembly for use in a transportation vehicle in opposing relation to a vehicle occupant, the air bag assembly comprising:

a gas emitting inflator;

an inflatable air bag cushion adapted to receive inflation gas from the inflator;

at least one tethering element operatively connected to a surface of the air bag cushion, such that said at least one tethering element is extendible from a first operative length to an increased operative length upon inflation of the air bag cushion; and a tether restraint assembly engaging said at least one tethering element along said at least one tethering element, wherein the tether restraint assembly is adapted to impart a restraining drag force to said at least one tethering element during operative extension of said at least one tethering element such that said at least one tethering element is maintained under tension substantially during operative extension of said at least one tethering element, such that a contouring force is maintained by said at least one tethering element at the surface of the air bag cushion during inflation of the air bag cushion, wherein said tether restraint assembly comprises a rotatable spool around which said at least one tethering element is wrapped prior to operative extension and wherein the rotatable spool is adapted to rotate as said at least one tethering element is pulled away from the rotatable spool, and the rotatable spool including a torsion element adapted to impart a torsion recovery force to the rotatable spool upon rotation of the rotatable spool.

2. The air bag assembly as recited in claim 1, wherein the torsion element comprises a torsion bar disposed at the interior of the rotatable spool.

3. The air bag assembly as recited in claim 1, comprising a plurality of tethering elements operatively connected to a surface of the air bag cushion, such that said plurality of tethering elements are extended to an increased operative length upon inflation of the air bag cushion.

4. The air bag assembly as recited in claim 3, wherein at least a portion of said plurality of tethering elements comprise elongate straps.

5. The air bag assembly as recited in claim 3, wherein said tether restraint assembly comprises a rotatable spool around which at least a portion of said tethering elements are wrapped prior to operative extension and wherein the rotatable spool is adapted to rotate as said tethering elements arm pulled away from the rotatable spool, and the rotatable spool including a torsion element adapted to impart a torsion recovery force to the rotatable spool upon rotation of the rotatable spool.

6. The air bag assembly as recited in claim 5, wherein the torsion element comprises a torsion bar disposed at the interior of the rotatable spool.

7. An air bag assembly for use in a transportation vehicle in opposing relation to a vehicle occupant seated at a driver's side of the vehicle, the air bag assembly comprising:
 a gas emitting inflator;
 an inflatable air bag cushion adapted to receive inflation gas from the inflator;
 a tethering element comprising an elongate tube structure operatively connected to a surface of the air bag cushion, such that said tethering element is extendible from a first operative length to an increased operative length upon inflation of the air bag cushion; and
 a tether restraint comprising a fixed decorative emblem engaging said tethering element along said tethering element such that said tethering element is maintained under tension between the emblem and the surface of the air bag cushion substantially during operative extension of said tethering element, such that a contouring force is maintained at the surface of the air bag cushion by said tethering element during inflation of the air bag cushion, the elongate tube structure being configured to pass in stretched relation around the emblem during inflation of the air bag cushion.

8. The air bag assembly as recited in claim 7, wherein the air bag cushion is substantially toroidal in shape.

9. The air bag assembly as recited in claim 8, wherein the elongate tube structure includes a proximal end secured at a position below the decorative emblem and a distal end held at an inner surface of the air bag cushion.

10. The air bag assembly as recited in claim 8, wherein the elongate tube structure comprises a textile material.

11. The air bag assembly as recited in claim 10, wherein the textile material comprises a woven nylon fabric.

12. The air bag assembly as recited in claim 10, wherein the textile material comprises a woven polyester fabric.

13. The air bag assembly as recited in claim 10, wherein the textile material comprises a knit nylon fabric.

14. The air bag assembly as recited in claim 10, wherein the textile material comprises a knit polyester fabric.

15. The air bag assembly as recited in claim 7, wherein the tether restraint further comprises a bridging surface element of variable diameter disposed at a position below the emblem.

16. The air bag assembly as recited in claim 15, wherein the bridging surface element is of a half toroid geometry.

17. The air bag assembly as recited in claim 7, further comprising a restraining hoop element disposed circumferentially at least partially around the elongate tube structure at a position below the emblem such that the elongate tube structure is held in sliding relation at the interior of the restraining hoop element.

* * * * *